United States Patent
Deng

(10) Patent No.: US 11,622,035 B1
(45) Date of Patent: Apr. 4, 2023

(54) WATERPROOF PHONE CASE

(71) Applicant: GUANGDONG XIZHONGXI TECHNOLOGY CO., LTD., Dongguan (CN)

(72) Inventor: Xiuhong Deng, Shaoyang (CN)

(73) Assignee: GUANGDONG XIZHIONGXI TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/575,669

(22) Filed: Jan. 14, 2022

(51) Int. Cl.
*H04M 1/18* (2006.01)
*H04M 1/02* (2006.01)

(52) U.S. Cl.
CPC ........... *H04M 1/18* (2013.01); *H04M 1/0249* (2013.01); *H04M 1/0266* (2013.01); *H04M 2250/22* (2013.01)

(58) Field of Classification Search
CPC .......... H04B 1/3888; H04B 2001/3894; H04B 2001/3883; H04B 2001/3822; H04M 1/04; H04M 1/181; H04M 1/06; H04M 1/18; H01F 7/0252
See application file for complete search history.

(56) References Cited

U.S. PATENT DOCUMENTS

2016/0150861 A1* 6/2016 Yao .................. G06F 1/1626
224/245
2016/0373152 A1* 12/2016 Schmidt ............... F16M 11/105

FOREIGN PATENT DOCUMENTS

CN 205546322 U * 8/2016
CN 211860240 U * 11/2020
CN 212638570 U * 3/2021

* cited by examiner

*Primary Examiner* — Ankur Jain
*Assistant Examiner* — Angelica Perez

(57) ABSTRACT

A waterproof phone case includes a front shell and a rear shell. The front shell is rotatably connected with the rear shell. The front shell cooperates with the rear shell to form an accommodating space configured to accommodate a mobile phone. An area of the front shell corresponding to the accommodating space includes a viewing area. A rotating portion and magnetic portions are arranged on a rear surface of the rear shell. The rotating portion is detachably connected with a rear hanger. The magnetic portions are magnetically connected with the rear hanger. Two different positions of the rear hanger are magnetically matched with the magnetic portions through the rotating portion of the rear shell.

12 Claims, 6 Drawing Sheets

WATERPROOF PHONE CASE

TECHNICAL FIELD

The present disclosure relates to a field of mobile phone accessories, and in particular to a waterproof phone case.

BACKGROUND

With development of smartphones, there are more and more scenarios where people need to use smartphones in their daily lives. In some special scenes, such as bathing, if a user can watch movies and TV shows while bathing, it will make people's lives more interesting. Conventional smartphones are unable to be directly exposed to wet environments. Therefore, there are bathroom waterproof phone boxes on the market. The smartphone is received in a waterproof phone box to meet normal use of the smartphone in the bathroom. A conventional waterproof phone box is fixed to a wall by hooks, adhesive, or suction cups. However, the waterproof phone box fixed by the hooks, the adhesives, or the suction cups is unable to rotate freely and is unable to be moved flexibly. Further, a mounting place of use is fixed.

SUMMARY

In view of above problems, the present disclosure provides a waterproof phone case to solve the problems that a conventional waterproof phone box fixed by hooks, adhesives, or suction cups is unable to rotate freely, is unable to be moved flexibly and a place of use is fixed.

In order to achieve the above purpose, the present disclosure provides a waterproof phone case. The waterproof phone case comprises a front shell and a rear shell. The front shell is rotatably connected with the rear shell. The front shell cooperates with the rear shell to form an accommodating space configured to accommodate a mobile phone.

An area of the front shell corresponding to the accommodating space comprises a viewing area.

A rotating portion and magnetic portions are arranged on a rear surface of the rear shell. The rotating portion is detachably connected with a rear hanger. The magnetic portions are magnetically connected with the rear hanger. Two different positions of the rear hanger are magnetically matched with the magnetic portions through the rotating portion of the rear shell.

Furthermore, an opening angle between the front shell and the rear shell ranges from 0-90°.

Furthermore, multiple magnetic portions are provided. The magnetic portions are evenly arranged in a circumferential direction with an axis of the rotating portion as a center.

Furthermore, stepped portions connecting the magnetic portions into a ring shape are arranged between each two adjacent magnetic portions. An end surface of each stepped portion is flush with a magnetic attraction surfaces of each of the magnetic portions.

Furthermore, the magnetic portions comprise embedding grooves on a front surface of the rear shell. A first magnetic piece is arranged in each of the embedding grooves.

Furthermore, a cover is arranged on the front surface of the rear shell. The cover is configured to cover each first magnetic piece.

Furthermore, an upper magnet is arranged in the front shell. A lower magnet corresponding to the upper magnet is arranged in the rear shell. When the rear shell is closed with the front shell, the upper magnet is magnetically connected with the lower magnet.

Furthermore, the front shell comprises an upper magnet mounting portion configured to mount the upper magnet. The upper magnet mounting portion comprises an upper magnet mounting groove and a buffer piece covering the upper magnet mounting groove. The upper magnet is arranged in the upper magnet mounting groove. The rear shell comprises a lower magnet mounting portion configured to mount the lower magnet. The lower magnet mounting portion comprises a lower magnet mounting groove. The lower magnet is arranged in the lower magnet mounting groove.

Furthermore, a silicone piece is arranged between the front shell and the rear shell. The silicone piece is a ring structure. The silicone piece is configured to seal the accommodating space when the front shell and the rear shell are closed.

Furthermore, a plurality of baffles are arranged on a front surface of the rear shell. Two groups of baffles are oppositely arranged. Rubber layers are arranged on the two groups of the baffles.

Furthermore, the front shell comprises a buckle configured to separate the front shell from the rear shell.

Furthermore, the viewing area is a touch screen arranged on the front shell.

Furthermore, a polyethyleneterephthalate (PET) anti-fog film is attached to the touch screen.

Furthermore, the rear hanger comprises a shaft sleeve portion and a plurality of magnet fixing portions. The shaft sleeve portion comprises a rotating groove configured to accommodate the rotating portion of the waterproof phone case. Fixing pieces are arranged on a rear portion of the rear hanger. The fixing pieces are double-sided tapes or suction cups. A second magnetic piece is arranged in each of the magnet fixing portions.

Compared with the prior art, the waterproof phone case and the rear hanger applied to the waterproof phone case or the present disclosure divide the conventional phone waterproof box into two portions. The waterproof phone case accommodating the mobile phone is configured to protect the mobile phone from water. The rear hanger is fixed on a wall. The waterproof phone case is detachably connected with the rear hanger, so the waterproof phone case and the rear hanger freely switch an installation position in multiple occasions, and the waterproof phone case is easily to rotate an angle to achieve horizontal or vertical viewing of the mobile phone.

Figure 1:
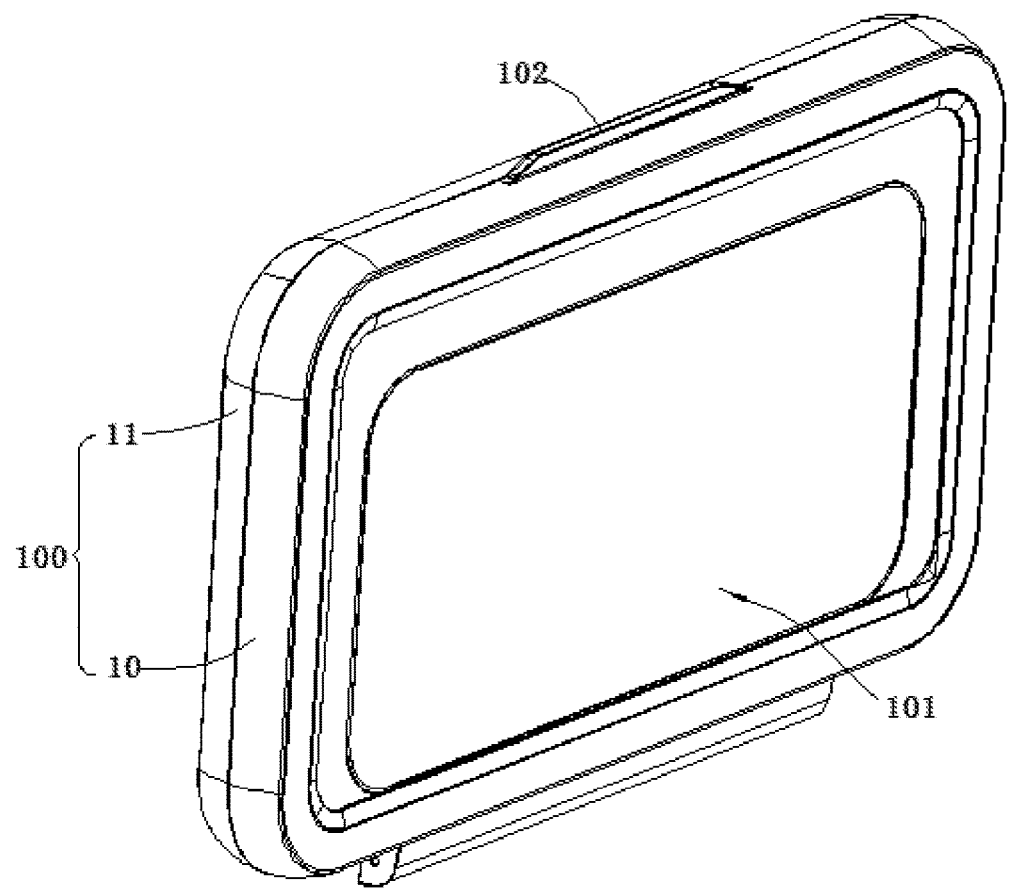
FIG. 1 is a perspective schematic diagram of a waterproof phone case of the present disclosure.
Figure 2:
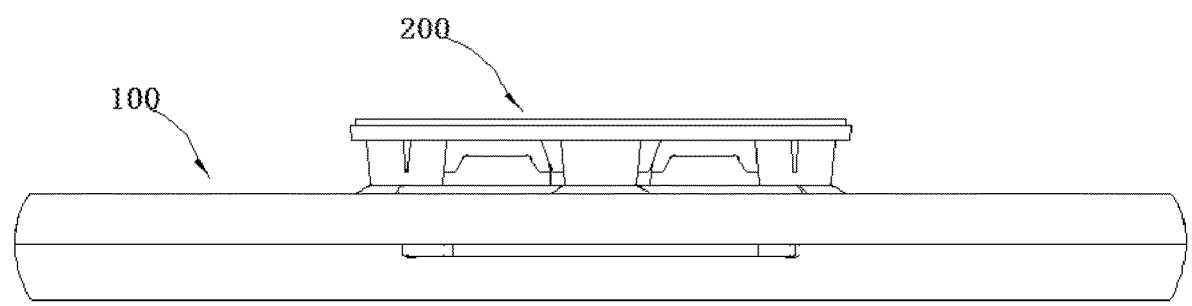
FIG. 2 is a top schematic diagram of the waterproof phone case and the rear hanger of the present disclosure.
Figure 3:
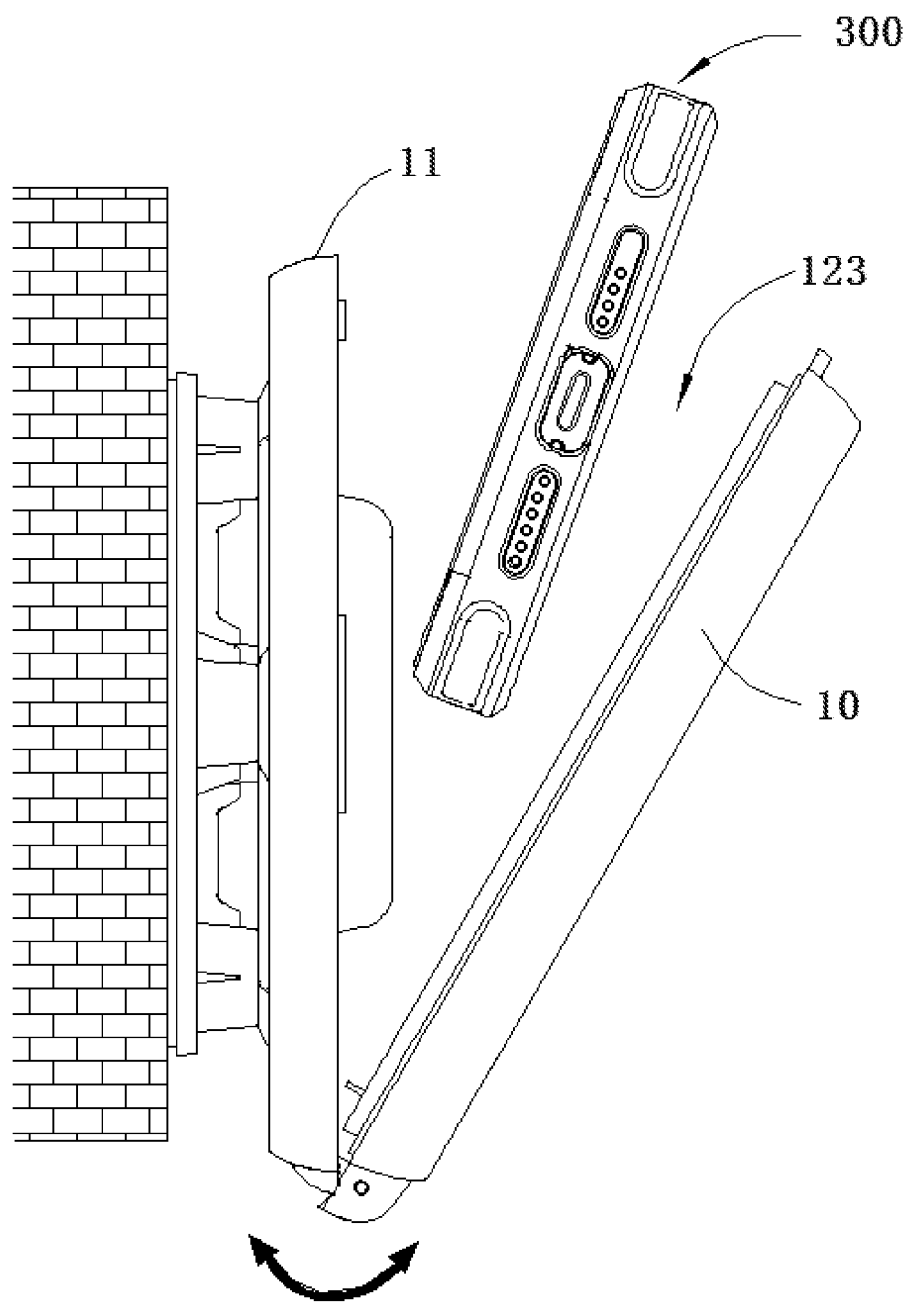
FIG. 3 is a structural schematic diagram of the waterproof phone case and the rear hanger of the present disclosure where the rear hanger is mounted on a wall.

In the drawings:
100—waterproof phone case; 10, front shell; 11, rear shell; 12—silicone piece; 101, viewing area; 102—buckle; 110—rotating portion; 111—magnetic portion; 112—stepped portion; 113—embedding groove; 114—first magnetic piece; 115, cover; 116—upper magnet; 117—lower magnet; 118—upper magnet mounting portion; 119—buffer piece; 120—lower magnet mounting portion; 121—baffle; 122—rubber layer; 123—accommodating space; 124—sealing groove; 200—rear hanger; 20—fixing piece; 201—shaft sleeve portion; 202—magnet fixing portion; 203—rotating groove; 204—second magnetic piece; 300—mobile phone.

DETAILED DESCRIPTION

The present disclosure will be described in detail below with reference to the accompanying drawings, and technical solutions in embodiments of the present disclosure will be described clearly and completely.

As shown in FIGS. 1-8, in one embodiment, the present disclosure provides a waterproof phone case 100. The waterproof phone case 100 comprises a front shell 10 and a rear shell 11. The front shell 10 is rotatably connected with the rear shell 11. The front shell 10 cooperates with the rear shell 11 to form an accommodating space 123 configured to accommodate a mobile phone 300. By separating the front shell 10 from the rear shell 11 to open the accommodating space 123 in a manner shown in FIG. 3, the mobile phone 300 is placed in the accommodating space 123, and then the front shell 10 and the rear shell 11 are closed to seal the mobile phone 300. An opening angle between the front shell 10 and the rear shell 11 ranges from 0-90°, which prevent the front shell 10 from accidentally unfolding to greater than 90° to form an oblique wave surface. Therefore, under action of gravity, the mobile phone is prevented form automatically falling out from the accommodating space 123. In the embodiment, by setting the limited opening angle and by adopting a magnetic closure method of the waterproof phone case, the front shell and rear shell are prevented from accidental opening and the mobile phone is prevented from falling.

In order to see a phone screen of the mobile phone in the accommodating space 123, an area of the front shell 10 corresponding to the accommodating space 123 comprises a viewing area 101. The viewing area 101 is a touch screen arranged on the front shell 10. The touch screen is a highly sensitive touch screen, which is barrier-free during sliding screen for entertainment. In addition, due to influence of steam in a bathroom and fumes in a kitchen, a polyethyleneterephthalate (PET) anti-fog film is attached to the viewing area 101. Therefore, the waterproof phone case is not afraid of kitchen fumes and bathroom steam.

Figure 4:
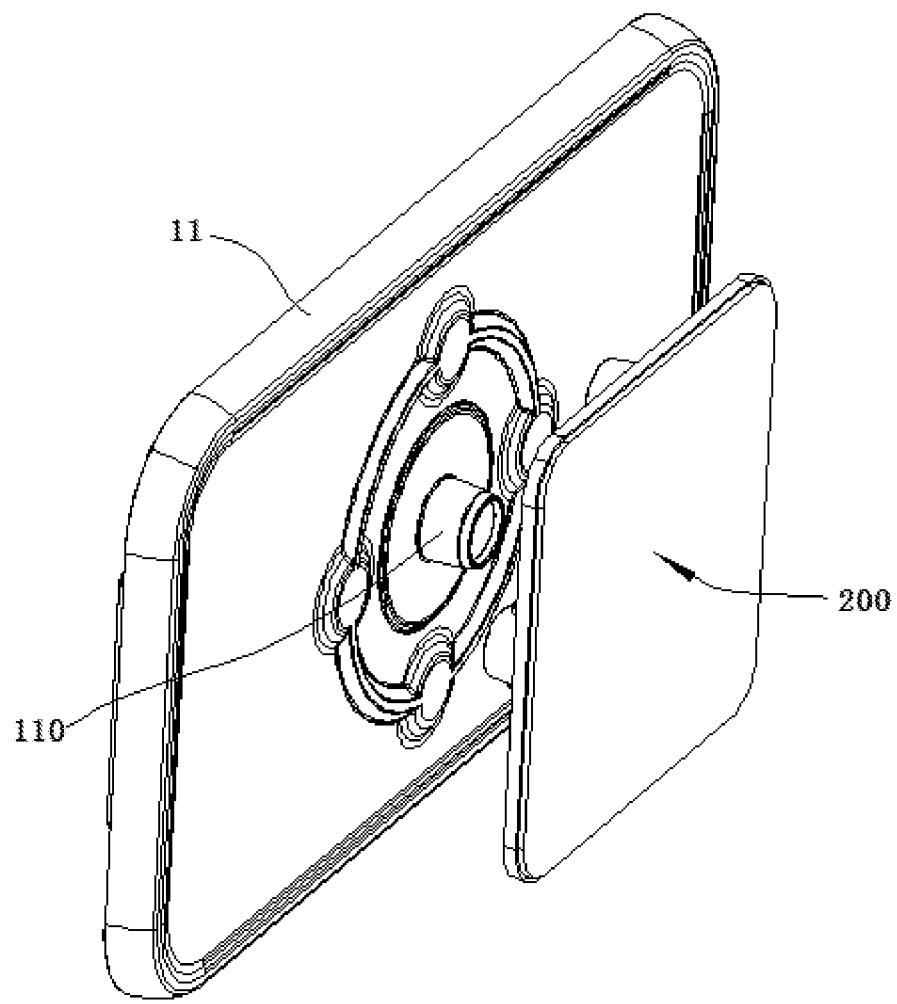
FIG. 4 is a structural schematic diagram of a rear shell and the rear hanger of the present disclosure where the rear shell is connected with the rear hanger.
Figure 5:
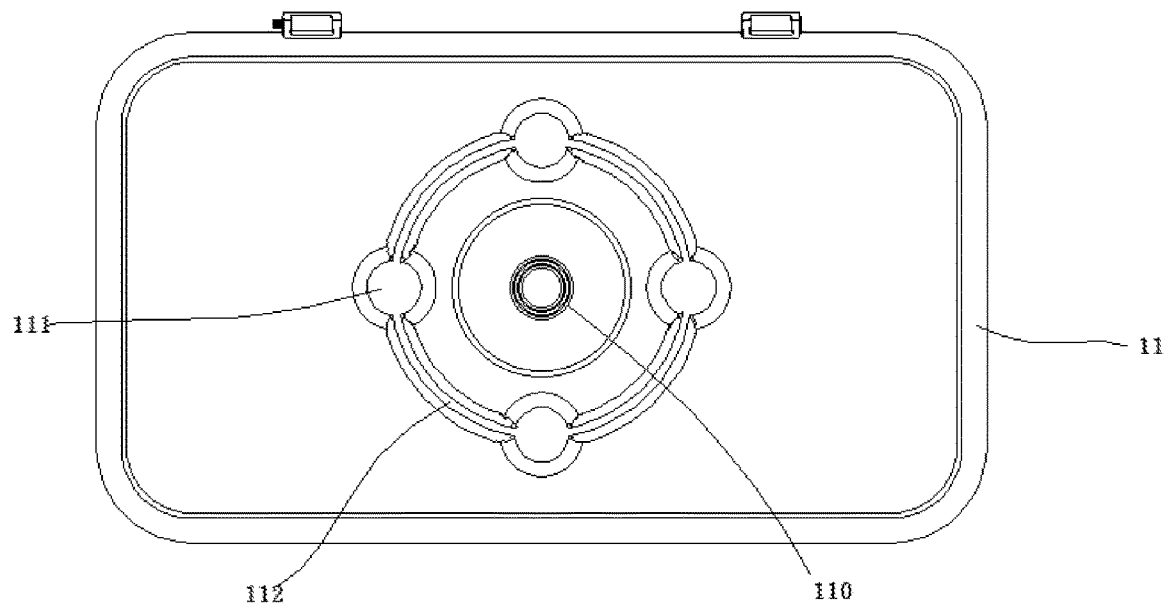
FIG. 5 is a rear structural schematic diagram of the rear shell of the present disclosure.

As shown in FIGS. 4 and 5, a rotating portion 110 and magnetic portions 111 are arranged on a rear surface of the rear shell 22. The rotating portion 110 is detachably connected with a rear hanger 200. The magnetic portions 111 are magnetically connected with the rear hanger 200. Two different positions of the rear hanger 200 are magnetically matched with the magnetic portions 111 through the rotating portion 110 of the rear shell 11. When the rear surface of the rear hanger 200 is made of a material that can be magnetically attracted to the magnetic portions 111, or the more the number of the magnetic portions 111, the more positions for the rear shell 11 to rotate and fix. That is, the mobile phone is able to be used in more directions, such as used in a landscape mode and a portrait mode.

In the embodiment, four magnetic portions 111 are provided. The four magnetic portions 111 are evenly arranged in a circumferential direction with an axis of the rotating portion 110 as a center. Each two adjacent magnetic portions 111 are separated by 90 degrees to ensure the use of the mobile phone in the landscape mode and the portrait mode. Stepped portions 112 connecting the four magnetic portions 111 into a ring shape are arranged between each two adjacent magnetic portions 111. An end surface of each stepped portion 112 is flush with a magnetic attraction surfaces of each of the magnetic portions 111. When the rear shell 11 rotates, the stepped portions 112 make the rear shell 11 rotate smoothly.

Figure 7:
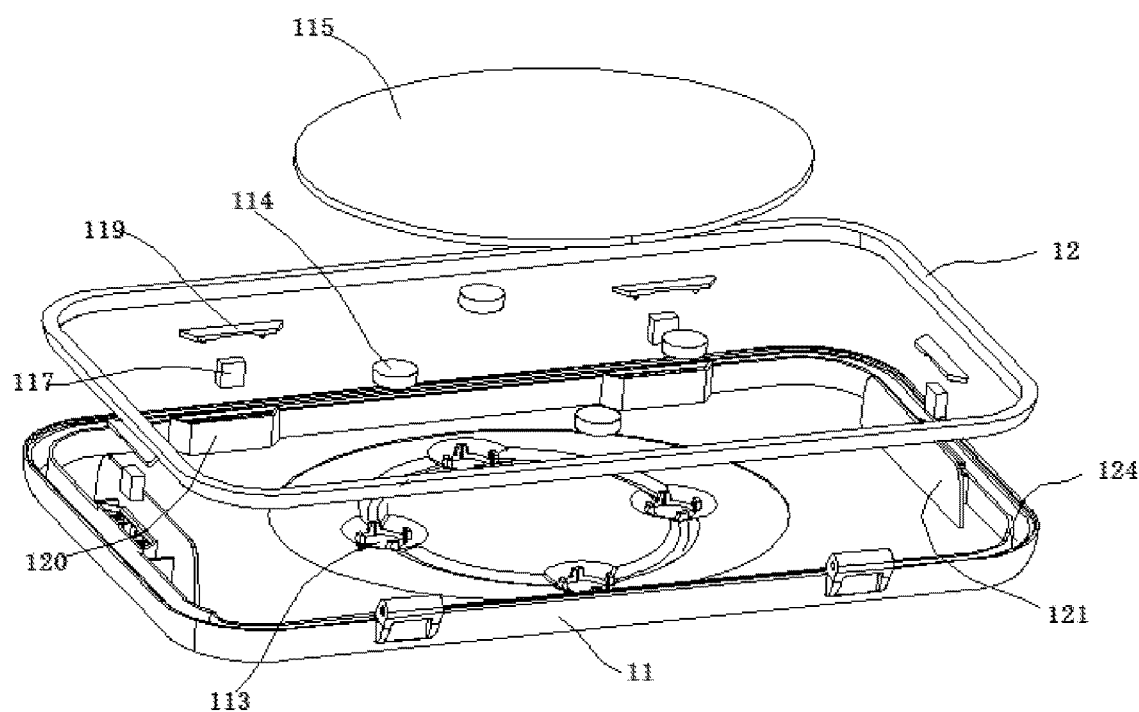
FIG. 7 is an exploded schematic diagram of the rear shell of the present disclosure.

As shown in FIG. 7, the magnetic portions 111 comprise embedding grooves 113 on a front surface of the rear shell 11. A first magnetic piece 114 is arranged in each of the embedding grooves 113. The first magnetic pieces 114 are selected from one or more of magnets, magnets, and metals, and are magnetically fixed to the second magnetic pieces 204 of the rear hanger 200. In the embodiment, the waterproof phone case is magnetically fixed and the waterproof phone case 100 is easily rotated along the circular direction of the stepped portions 112. If the waterproof phone case needs to be used in multiple places, a corresponding rear hanger 200 is mounted at a use position of each place. Through above structures, the waterproof phone case 100 is easily removed and freely transferred.

A cover 115 is arranged on the front surface of the rear shell 11. The cover 115 is configured to cover each first magnetic piece 114. Moreover, the cover 115 is made of flexible materials such as sponge or rubber. On one hand, the cover 115 hides and fixes the first magnetic pieces 114 to improve aesthetic effect. On the other hand, the cover 115 prevents the mobile phone 300 from being damaged by rigid contact between the first magnetic pieces 114 and the mobile phone 300 after the mobile phone 300 is placed in the accommodating space 123.

Figure 8:
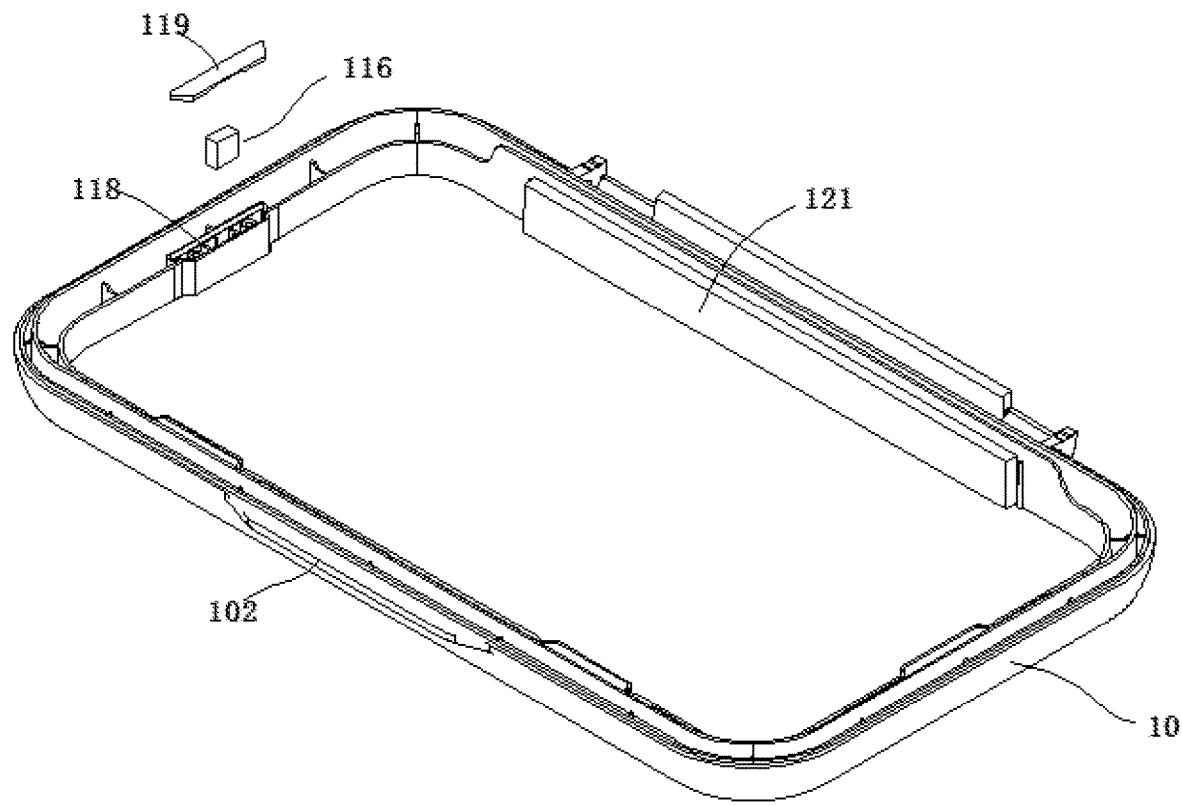
FIG. 8 is a structural schematic diagram of a front shell of the present disclosure.
Figure 9:
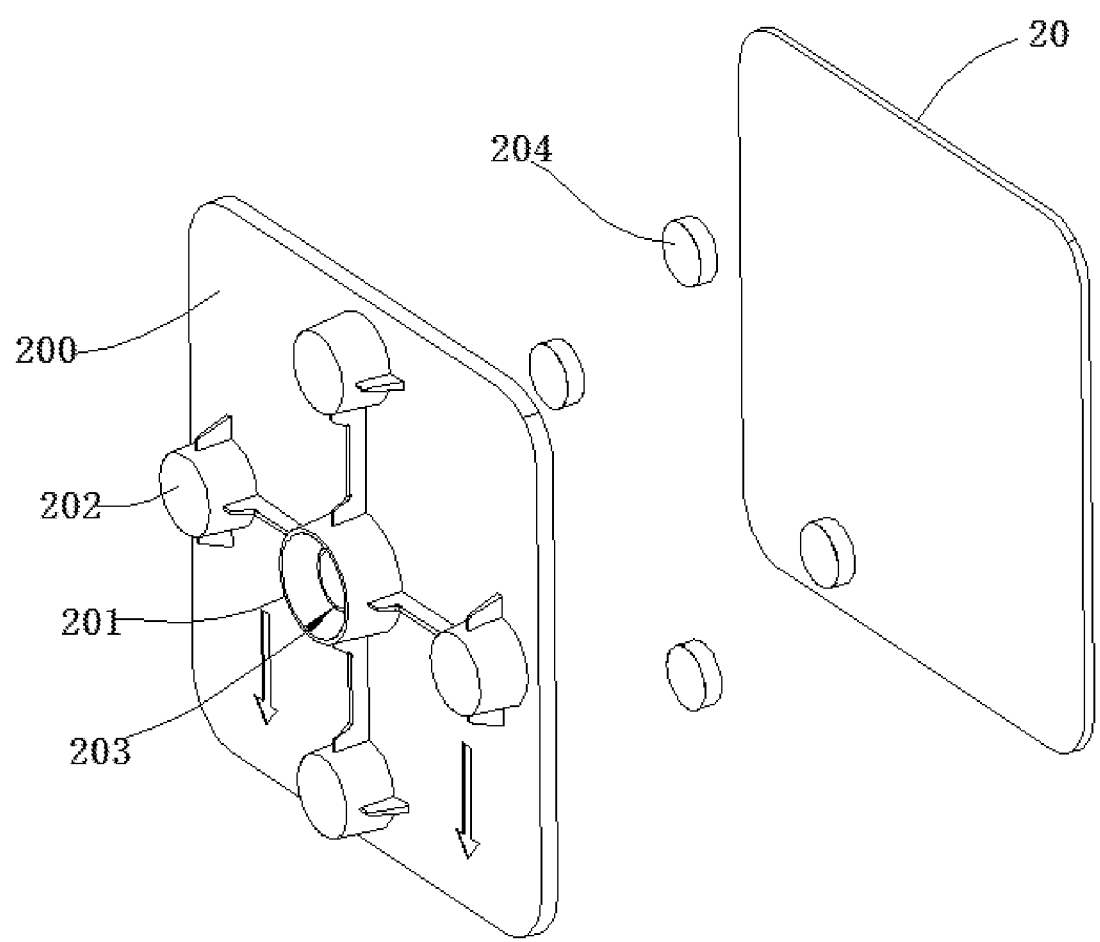
FIG. 9 is an exploded schematic diagram of the rear hanger of the present disclosure.

As shown in FIGS. 7 and 8, an upper magnet 116 is arranged in the front shell 10. A lower magnet 117 corresponding to the upper magnet 116 is arranged in the rear shell 11. When the rear shell 11 is closed with the front shell 10, the upper magnet 116 is magnetically connected with the lower magnet 117. Compared with the opening and closing of the front shell and rear shell relying on mechanical buckling, the opening and closing of the front shell and rear shell in the embodiment adopts the magnetic attraction method, which is easy and labor-saving.

The front shell 10 comprises an upper magnet mounting portion 118 configured to mount the upper magnet 116. The upper magnet mounting portion 118 comprises an upper magnet mounting groove and a buffer piece 119 covering the upper magnet mounting groove. The upper magnet 116 is arranged in the upper magnet mounting groove. The rear shell 11 comprises a lower magnet mounting portion 120 configured to mount the lower magnet 117. The lower magnet mounting portion 120 comprises a lower magnet mounting groove. The lower magnet 117 is arranged in the lower magnet mounting groove. During a closing process, the buffer piece 119 avoids rigid contact between the upper magnet and the lower magnet.

In order to achieve easy opening and closing of the waterproof phone case, a buckle is extended and arranged at an edge of the front shell 10, so the front shell 10 can be opened by hand.

Figure 6:
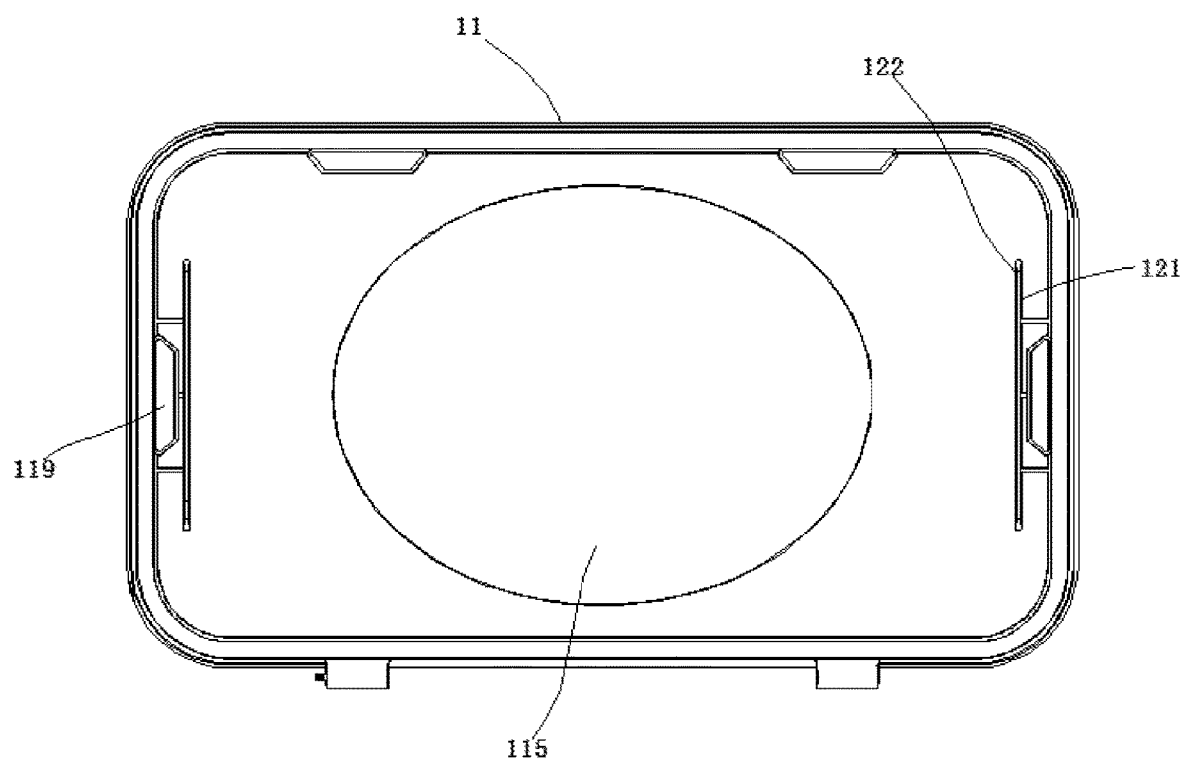
FIG. 6 is a front structural schematic diagram of the rear shell of the present disclosure.

As shown in FIG. 6, a plurality of baffles 121 are arranged on a front surface of the rear shell 11. Two groups of baffles 121 are oppositely arranged. Rubber layers 122 are arranged on the two groups of the baffles 121, which prevent damages to the mobile phone.

In addition, as shown in FIG. 7, a sealing groove 124 is arranged between the front shell 10 and the rear shell 11. The sealing groove 124 is ring-shapes. A silicone piece 12 is arranged in the sealing groove 124. The waterproof phone case is sealed by the silicone piece 12 embedded in the sealing groove 124, so the waterproof phone case is used with peace of mind, without worrying about water vapor intruding into the electronic components of the mobile phone in the waterproof phone case.

In one embodiment, the present disclosure provides a rear hanger 200 connected with the rear shell of the waterproof phone case. The rear hanger 200 comprises a shaft sleeve portion 201 and a plurality of magnet fixing portions 202. The shaft sleeve portion 201 comprises a rotating groove 203 configured to accommodate the rotating portion 110 of the waterproof phone case 100. Fixing pieces 20 are arranged on a rear portion of the rear hanger 200. The fixing pieces 20 are double-sided tapes or suction cups. A second magnetic piece 204 is arranged in each of the magnet fixing portions 202. The fixing pieces 20 hide the second magnetic piece 204. When the rear hanger 200 is used in conjunction with the waterproof phone case 100, the rear hanger 200 is attached to the position to be used, the rotating portion 110 is extended into the rotating groove 203. Then the waterproof phone case 100 is rotated 100 to make the magnetic portion 111 of the waterproof phone case 100 to be aligned with the magnet fixing portions 202 of the rear hanger 200.

The invention claimed is:

1. A waterproof phone case, comprising:
a front shell; and
a rear shell;
wherein the front shell is rotatably connected with the rear shell; the front shell cooperates with the rear shell to form an accommodating space configured to accommodate a mobile phone;
wherein an area of the front shell corresponding to the accommodating space comprises a viewing area;
wherein a rotating portion and magnetic portions are arranged on a rear surface of the rear shell; the rotating portion is detachably connected with a rear hanger; the magnetic portions are magnetically connected with the rear hanger;
wherein two different positions of the rear hanger are magnetically matched with the magnetic portions through the rotating portion of the rear shell; and
wherein the magnetic portions are evenly arranged in a circumferential direction with an axis of the rotating portion as a center; stepped portions connecting the magnetic portions into a ring shape are arranged between each two adjacent magnetic portions; an end surface of each stepped portion is flush with a magnetic attraction surfaces of each of the magnetic portions.

2. The waterproof phone case according to claim 1, wherein an opening angle between the front shell and the rear shell ranges from 0-90°.

3. The waterproof phone case according to claim 1, wherein the magnetic portions comprise embedding grooves on a front surface of the rear shell; a first magnetic piece is arranged in each of the embedding grooves.

4. The waterproof phone case according to claim 3, wherein a cover is arranged on the front surface of the rear shell; the cover is configured to cover each first magnetic piece.

5. The waterproof phone case according to claim 1, wherein an upper magnet is arranged in the front shell; a lower magnet corresponding to the upper magnet is arranged in the rear shell; when the rear shell is closed with the front shell, the upper magnet is magnetically connected with the lower magnet.

6. The waterproof phone case according to claim 5, wherein the front shell comprises an upper magnet mounting portion configured to mount the upper magnet; the upper magnet mounting portion comprises an upper magnet mounting groove and a buffer piece covering the upper magnet mounting groove; the upper magnet is arranged in the upper magnet mounting groove; the rear shell comprises a lower magnet mounting portion configured to mount the lower magnet; the lower magnet mounting portion comprises a lower magnet mounting groove, the lower magnet is arranged in the lower magnet mounting groove.

7. The waterproof phone case according to claim 1, wherein a silicone piece is arranged between the front shell and the rear shell; the silicone piece is a ring structure; the silicone piece is configured to seal the accommodating space when the front shell and the rear shell are closed.

8. The waterproof phone case according to claim 1, wherein a plurality of baffles are arranged on a front surface of the rear shell; two groups of baffles are oppositely arranged; rubber layers are arranged on the two groups of the baffles.

9. The waterproof phone case according to claim 1, wherein the front shell comprises a buckle configured to separate the front shell from the rear shell.

10. The waterproof phone case according to claim 1, wherein the viewing area is a touch screen arranged on the front shell.

11. The waterproof phone case according to claim 1, wherein a polyethyleneterephthalate (PET) anti-fog film is attached to the touch screen.

12. The waterproof phone case according to claim 1, wherein the rear hanger comprises a shaft sleeve portion and a plurality of magnet fixing portions;
wherein the shaft sleeve portion comprises a rotating groove configured to accommodate the rotating portion of the waterproof phone case; fixing pieces are arranged on a rear portion of the rear hanger; and the fixing pieces are double-sided tapes or suction cups; a second magnetic piece is arranged in each of the magnet fixing portions.

* * * * *